M. NEFT.
KNIFE.
APPLICATION FILED JULY 8, 1921. RENEWED AUG. 7, 1922.
1,431,835.
Patented Oct. 10, 1922.
2 SHEETS—SHEET 1.
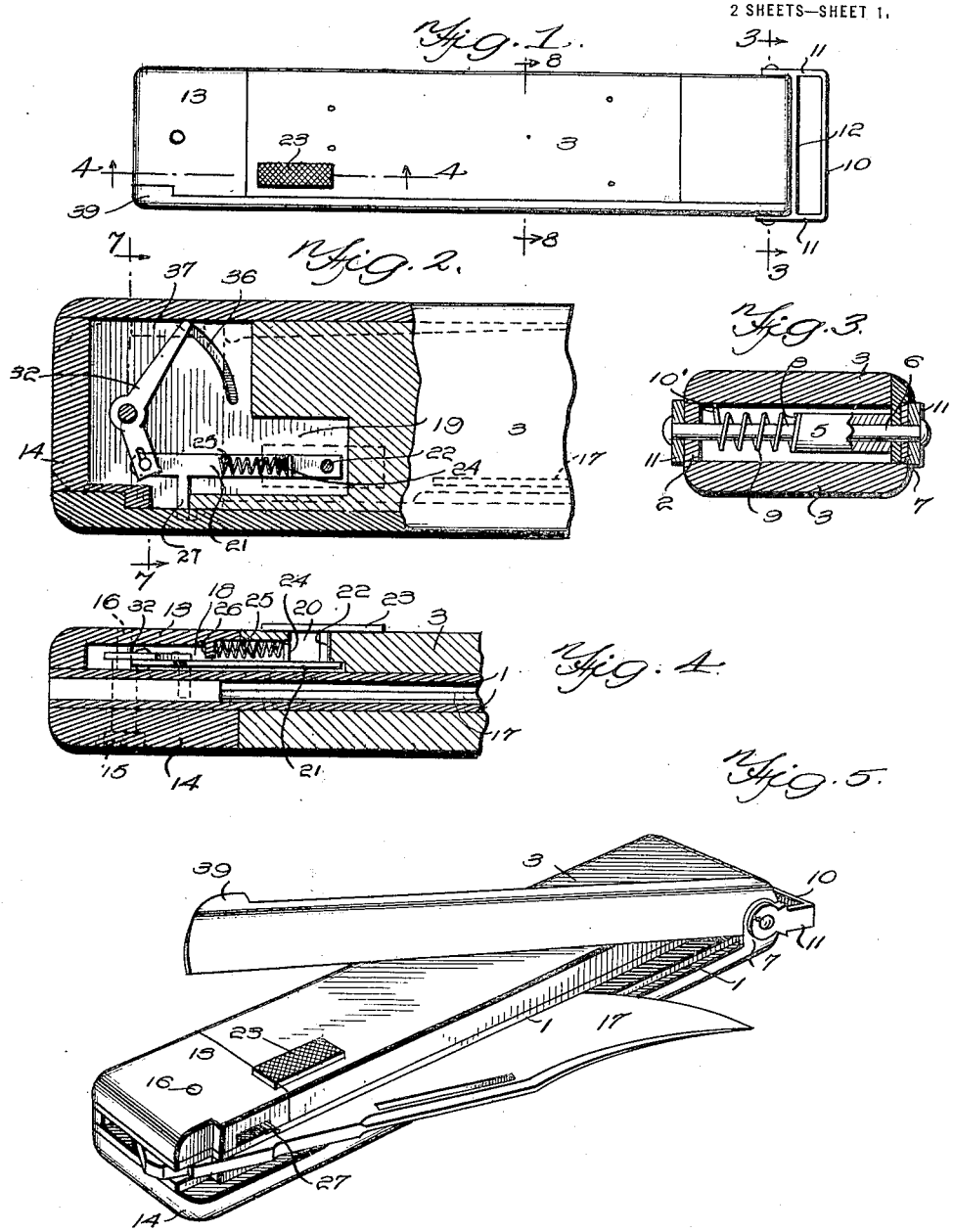
Inventor
Max Neft;

M. NEFT.
KNIFE.
APPLICATION FILED JULY 8, 1921. RENEWED AUG. 7, 1922.
1,431,835.
Patented Oct. 10, 1922.
2 SHEETS—SHEET 2.
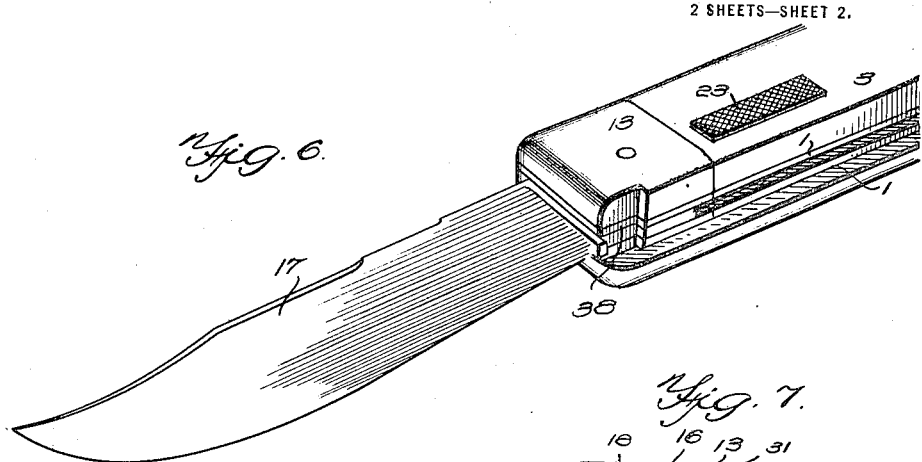
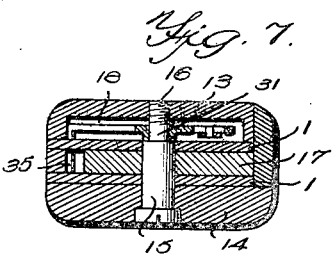
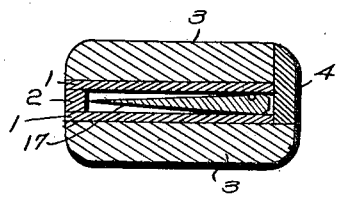
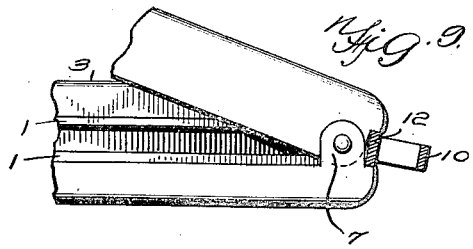
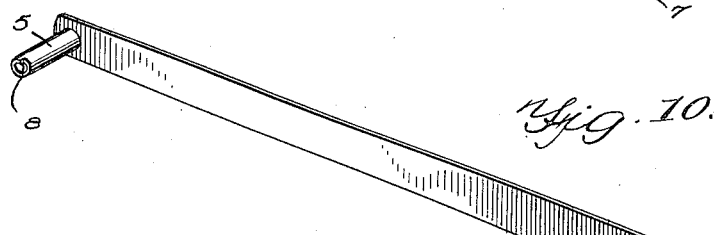
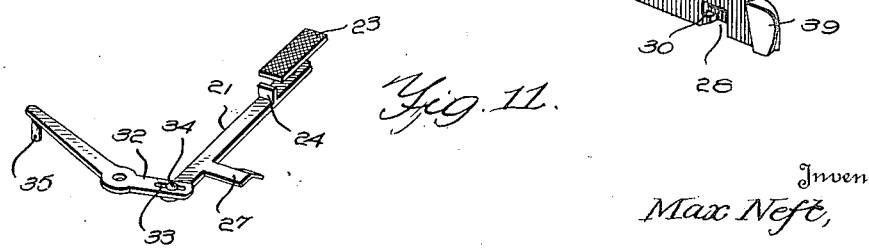
Inventor
Max Neft,
By
Attorney Patented Oct. 10, 1922.

1,431,835

UNITED STATES PATENT OFFICE.

MAX NEFT, OF SEATTLE, WASHINGTON.

KNIFE.

Application filed July 8, 1921, Serial No. 483,286. Renewed August 7, 1922. Serial No. 580,293.

*To all whom it may concern:*

Be it known that I, MAX NEFT, a citizen of the United States, residing at Seattle, in the county of King and State of Washington, have invented certain new and useful Improvements in Knives, of which the following is a specification.

This invention relates to knives, and it comprises a casing having a hinged side, a knife pivotally mounted in the casing and adapted to be removed through said hinged side when the hinged side is in open position, locking means to normally retain the hinged side in closed position, and means actuated by the movement of said locking means to swing the knife blade on its pivot.

An object of the invention is to provide a knife in which the blade will be concealed within the body or casing when not in use, but may be readily and quickly moved to an open position when desired.

A further object of the invention is the provision of novel mechanism for locking the blade in closed position and turning the knife on its pivot.

A further object is the provision of an actuating device which will not interfere with the movement of the blade about its pivot, but will give it an initial turning to facilitate removal from the casing.

In the accompanying drawings, I have shown one embodiment of the invention. In this showing:

Figure 1 is a plan view,

Figure 2 is a similar view of the forward end of the casing, parts being shown in section, Figure 3 is a transverse sectional view on line 3—3 of Figure 1, Figure 4 is a longitudinal sectional view on line 4—4 of Figure 1, Figure 5 is a perspective view showing the position of the parts when the actuating mechanism is operated, Figure 6 is a perspective view showing the blade in open position, Figure 7 is a transverse sectional view on line 7—7 of Figure 2, Figure 8 is a similar view on line 8—8 of Figure 1, Figure 9 is a detail view of the rear end of the casing, Figure 10 is a detail perspective view of the hinged side, and, Figure 11 is a detail view of the actuating mechanism.

Referring to the drawings, the reference numeral 1 designates the top and bottom plates which are suitably spaced from each other for the reception of a blade. One side of the casing is provided with a side wall 2. These parts may be formed of metal or other suitable material, and the top and bottom may be provided with the usual grips 3 of wood, hard fibre, or suitable composition. A plate 4 forms the opposite side of the casing, the plate being hinged to permit access to the interior of the casing for the removal of the blade. As shown, the lower grip 3 extends beyond the upper grip forming, in effect, a shoulder for the reception of the hinged side.

The hinged side is provided with a tubular extension 5 at the rear end adapted to surround a pivot pin 6, the pin being mounted in the side wall 2, as shown, and being mounted in a plate 7, secured to the bottom of the casing and extending upwardly therefrom (see Figure 9). The tubular member is provided with a shoulder 8, adapted to be engaged by one end of a coil spring 9 which surrounds the pivot pin, the other end of the spring engaging the casing, as at 10', to retain the hinged side in open position when unlocked. A handle 10 is arranged at the rear end of the casing, the handle being provided with arms 11, having openings for the reception of pivot pin, whereby the handle is pivotally mounted to the casing. The handle is provided with a transverse member 12, arranged in alinement with the rear end of the casing and adapted to be received between the bottom plate and the hinged side to limit the upward movement of the hinged side to the position shown in Figures 5 and 9.

Adjacent the forward end of the casing, the top grip 3 is cut away and a block 13 of metal is arranged over the top plate 1. A similar block 14 is arranged beneath the bottom plate, forming a forward portion of the casing constructed entirely of metal and furnishing a substantial support for the pivot pin which receives the blade. As shown, a pin 15 passes through openings arranged in the top and bottom plates and in the blocks 13 and 14. The opening in the block 13 is threaded and is adapted to be engaged by threads 16 formed on the pivot pin. A blade 17 is mounted on the pivot pin and is adapted to swing in a plane parallel to the top and bottom plates and at right angles to the hinged side.

Suitable locking mechanism is provided to normally retain the hinged side in closed position, against the tension of spring 9. As shown, the block 13 is provided with a recess 18 and the forward end of the top grip 3 is provided with a similar recess 19 in alinement therewith. The recess 19 communicates with an opening 20, extending through the outer face of the grip. A locking member 21 is arranged in the recesses 18 and 19, the locking member being provided with a pin 22 extending through the opening 20. A plate or finger grip 23 is formed on the end of this pin to permit operation of the locking or actuating mechanism. As shown, a lug or projection 24 is formed on the locking member, and this lug is adapted to be engaged by a spring 25, arranged between it and a shoulder 26 to normally retain the locking member in the position shown in Figure 4 of the drawings. The locking member is provided with a lateral extension 27, adapted to enter a recess 28 formed in the hinged side. The inner end of the recess extends longitudinally of the hinged side forming a shoulder 30, which is engaged by the lateral extension 27 when the parts are in closed position.

The upper end of the pivot pin is reduced in size, as at 31, and is adapted to form a pivot for a lever 32, which imparts initial movement to the blade when it is to be removed from the casing. As shown, the lever is provided with a slot 33 adapted to receive a pin 34 carried by the locking member. The offset end of the lever is provided with a pin 35 which extends through a slot 36 in the top plate and is adapted to enter a notch 37 formed in the heel of the blade.

The top and bottom plates and the block 13 are provided with a recess 38, at the front end adapted to receive an enlargement 39 formed on the hinged side when it is in closed position. When the blade is opened, the recess or notch 37 is adapted to be alined with the recess 38, and if the blade is not fully opened to its proper position, the enlargement 39 enters the notch or recess 37 and moves the blade to open position.

In using the knife with the parts in the position shown in Figure 1 of the drawings, the finger grip is moved forwardly against the tension of spring 25, moving the locking member until the lateral extension 27 is disengaged from the shoulder 30, permitting the hinged side to be moved to the open position by the tension of spring 9. Further movement of the locking member 21 swings the lever 32 on its pivot causing the pin 35 to engage the wall of notch 37 and move the blade to substantially the position shown in Figure 5 of the drawings. The blade is then moved to the fully open position and the hinged side closed, the locking member being brought into locked position by spring 25. In closing the knife, the operation is reversed and the knife replaced in the casing.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:

1. A knife comprising a casing having a hinged side, a blade pivoted in said casing for removal through said hinged side, means for locking said hinged side, and means actuated by said locking means to impart an initial movement to the blade.

2. A knife comprising a casing having an opening in one side, a hinged member covering said opening, a blade pivoted in said casing for removal through said opening, the blade being adapted to swing in a plane at right angles to said closure member, locking means to retain said closure member in closed position, and means actuated by said locking means to impart an initial movement to the blade.

3. A knife comprising a casing having an open side, a closure member hinged to said casing to normally close said side, said closure member being provided with a recess, a blade pivotally mounted in said casing for removal through said open side, a longitudinally movable locking member, carried by said casing and adapted to enter the recess in said closure member to retain the closure member in closed position, and means actuated by the release of said locking member to impart an initial movement to the blade.

4. A knife comprising a casing having an open side, a closure member hinged to the casing and normally closing said open side, a blade pivotally mounted in the casing for removal through said open side, said closure member being provided with a recess on the face adjacent the casing, a longitudinally movable locking member carried by the casing, a lug carried by said locking member and entering said recess, and means actuated by the release of said locking member to impart an initial movement to the blade.

5. A knife comprising a casing having an open side, a closure member hinged to the casing and normally closing said open side, a blade pivotally mounted in the casing for removal through said open side, said closure member being provided with a recess on the face adjacent the casing, a longitudinally movable locking member carried by the casing, a lug carried by said locking member and entering said recess, and a pivoted lever mounted in said casing and connected to said locking member to impart an initial movement to the blade when the locking member is released.

6. A knife comprising a casing having an open side, a closure member hinged to the casing and normally closing said open side, a blade pivotally mounted in the casing for removal through said open side, said closure member being provided with a recess on the face adjacent the casing, a longitudinally movable locking member carried by the casing, a lug carried by said locking member and entering said recess, a pivoted lever mounted in said casing and connected to said locking member to impart an initial movement to the blade when the locking member is released, and a pin carried by said lever adapted to engage a portion of the blade.

In testimony whereof I affix my signature in presence of two witnesses.

MAX NEFT.

Witnesses:
GEO. F. BRELSFORD,
H. F. BARNES.